United States Patent Office 2,914,539
Patented Nov. 24, 1959

2,914,539

PROCESS FOR THE MANUFACTURE OF HYDROXYTHIONAPHTHENES

Rudolf Mory, Dornach, Ernst Stoecklin, Binningen, and Max Schmid, Riehen, Switzerland, assignors to Ciba Limited, Basel, Switzerland, a firm No Drawing. Application April 19, 1957
Serial No. 653,735

Claims priority, application Switzerland January 28, 1955

3 Claims. (Cl. 260—330.5)

This is a continuation-in-part of our copending application Serial No. 561,157, filed January 24, 1956.

In the known processes for the manufacture of hydroxythionaphthenes from the corresponding arylthioglycollic acids, the latter are reacted with phosphorus halides in an organic solvent to form the acid halides, and these are cyclized with aluminum chloride to form the hydroxythionaphthenes. The use of phosphorus halides entails the disadvantage that phosphoric acids in the form of a sludge are formed as by-products and that this sludge has to be removed before the treatment with aluminum chloride is carried out. The sludge is difficult to filter, and the reaction product must therefore be allowed to stand until all of the sludge has settled on the bottom of the reaction vessel. This requires several hours, entails the cumbersome work of cleaning the reaction vessel, and thus reduces the output rate. Attempts have been made to overcome these difficulties by using thionyl chloride as acid-chlorinating agent, which is known to give as a rule, in addition to the acid chloride, only volatile reaction products. However, if the so-obtained acid chlorides are cyclized with aluminum chloride to the corresponding hydroxythionaphthenes considerable resin formation takes place and makes this procedure unsuitable.

It has now been found that said difficulties can be overcome in a simple manner, by reacting an arylthioglycollic acid with at least the theoretical amount of thionyl chloride in the presence of an inert organic solvent and of, as catalyst, a formic acid amide of which the amide nitrogen atom is derived from a secondary amine, heating the so obtained arylthioglycollic acid halide in the presence of at least one mol of anhydrous aluminum chloride and isolating the resulting hydroxythionaphthene from the reaction mixture.

As arylthioglycollic acids there may be used preferably naphthalene thioglycollic acids, for example, naphthalene-1- or 2-thioglycollic acid, 8-chloronaphthalene 1-thioglycollic acid, or phenylthioglycollic acids, such as phenyl thioglycollic acid, 2-chloro-1-methylbenzene-4-thioglycollic acid, 2:4 - dichloro - 1 - methylbenzene - 5-thioglycollic acid, 2-chloro-1:4-dimethylbenzene - 5 - thioglycollic acid, 4-chloro-2-methylbenzene-1-thioglycollic acid, 4-chlorobenzene-1-thioglycollic acid, 3,4-dichlorobenzene-1-thioglycollic acid and 3-chlorobenzene-1-thioglycollic acid.

As formic acid amides of which the amide nitrogen atom is derived from a secondary amine, advantageously an aliphatic or heterocyclic secondary amine, there may be used in the present process above all formic acid amides of which the amide nitrogen atom is bound, on the one hand, to the HCO-group, and, on the other, to two alkyl groups which may form a part of a ring that may contain a further hetero atom, advantageously an oxygen atom. As such formic acid amides there may be used, for example, formic acid morpholide or formic acid piperidide, and especially formic acid dialkylamides, advantageously those which contain two alkyl groups of low molecular weight, for example, formic acid dimethylamide or formic acid diethylamide. The proportion of the formic acid amide used may vary within very wide limits, and if desired, the reaction may be carried out in the presence of an inert diluent or solvent. Thus, for example, the acid used may be dissolved or suspended in dimethyl-formamide and the theoretical quantity or a slight excess of the thionyl chloride added. It is also possible and in some cases advantageous to introduce the organic acid into thionyl chloride or into a solvent inert towards acid chlorides, such as benzene, chlorobenzene, toluene, nitrobenzene, xylene or the like, to add to the resulting solution or mixture a formic acid amide of the kind described above in excess or in an equivalent quantity calculated on the acid or in a smaller quantity, for example, a catalytic quantity, that is to say a quantity considerably less than one equivalent, for example, 0.05 to 0.1 of an equivalent, and to carry out the reaction with thionyl chloride in the resulting reaction mixture.

The proportion of the thionyl chloride may likewise vary within wide limits. However, it is of advantage to use approximately the quantity theoretically required to convert the organic acid into its chloride, or a small excess.

The reaction may be carried out at a raised temperature, for example, at the boiling temperature of the reaction mixture or at a substantially lower temperature. When the reaction is carried out in a dialkyl-formamide alone the reaction generally sets in very easily at ordinary temperature with the spontaneous evolution of heat, so that it is not necessary to heat the reaction mixture externally. The reaction is finished in a very short time.

Then the anhydrous aluminum chloride may be added directly to the reaction mixture. However, it is of advantage to add the solution of the acid chloride as obtained in the first step to a suspension of the aluminum chloride in an inert organic solvent. The molecular proportion of aluminum chloride to arylthioglycollic acid must be at least 1:1. In some cases it is advantageous to use a slight excess, for example, 5 to 30% of aluminum chloride. However, no advantage is gained by using more than 1.5 mols of aluminum chloride per mol of acid chloride. The subsequent treatment to effect ring closure is advantageously carried out at a raised temperature for example at 40–100° C. The presence of a formamide of the kind described above is also favorable for this reaction step in that the hydroxythionaphthenes formed are obtained in a very pure state and in very good yield.

The following examples illustrate the invention, the parts and percentages being by weight unless otherwise stated, and the relationships of parts by weight to parts by volume being the same as that of the kilogram to the liter.

*Example 1*

115.5 parts of naphthalene-2-thioglycollic acid are introduced into a mixture of 245 parts by volume of chlorobenzene and 4.1 parts by volume of dimethylformamide and 39.4 parts by volume of thionyl chloride are added. The mixture is heated for 15 minutes at 55–60° C., and then the greater part of the waste gas is removed from the resulting solution by blowing in dry air at the same temperature. The solution of the chloride is then introduced dropwise in the course of 30 minutes into a suspension, heated at 70–72° C., of 73 parts of anhydrous aluminum chloride in 450 parts by volume of chlorobenzene, and the mixture is maintained for a further hour at 70–72° C. The reaction mixture is then poured on to ice, the chlorobenzene is distilled off with steam under reduced pressure, and the residue is isolated by filtration. The 2:1-naphthioindoxyl obtained in this manner is very pure and precipitates out in practically quantitative yield.

Instead of 4.1 parts by volume of dimethyl formamide there can be used with equal success an equivalent quantity of diethyl formamide, di-n-butyl-formamide, N-formyl-morpholine or N-formyl-piperidine.

Example 2

73 parts of 8-chloro-naphthalene-1-thioglycollic acid are mixed with 270 parts by volume of chlorobenzene, 2.24 parts by volume of dimethyl formamide, and 21.5 parts by volume of thionyl chloride. The mixture is heated at 55–60° C. for 30 minutes, and the greater part of the gases formed are expelled from the resulting solution by blowing in dry air at the same temperature. The solution of the thioglycollic acid chloride is then added dropwise in the course of 30 minutes to a suspension of 51 parts of anhydrous aluminum chloride in 270 parts by volume of chlorobenzene having a temperature of 45–49° C. The mixture is maintained at 48°–50° C. for 25 minutes and then poured on to ice water and some hydrochloric acid. The chlorobenzene is driven off by steam distillation under reduced pressure and the residue isolated by filtration. On washing with cold water and drying under reduced pressure at 40–60° C. there is obtained the 8-chloro-1,2-naphthioindoxyl in a very pure state and in practically quantitative yield.

Example 3

88 parts of 2,4-dichloro-5-methyl-phenyl-thioglycollic acid are mixed with 100 parts by volume of chlorobenzene, 2.7 parts by volume of dimetyhlformamide, and 26 parts by volume of thionyl chloride. The mixture is heated at 55–60° C. for 10 minutes, and the greater part of the gases formed are expelled from the resulting solution by blowing in dry air at the same temperature. In the course of an hour the thioglycollic acid chloride is added dropwise to a suspension having a temperature 52–54° C. of 51.5 parts of anhydrous aluminum chloride in 100 parts by volume of chlorobenzene. The mixture is maintained at 49–51° C. for 1 hour and then poured on to ice water and some hydrochloric acid. The chlorobenzene is driven off by steam distillation under reduced pressure and the residue isolated by filtration. On washing with cold water and drying under reduced pressure at 40–60° C. there is obtained the 4-methyl-5,7-dichloro-hydroxythionaphthene in a very pure state and in practically quantitative yield.

By using as starting material, instead of the 88 parts of 2,4-dichloro-5-methyl-phenyl-thioglycollic acid, 80.7 parts of 4-chloro-2,5-dimethyl-phenylthioglycollic acid and proceeding otherwise as described in this example there is obtained with equal success the 4,7-dimethyl-5-chloro-hydroxythionaphthene.

Example 4

76 parts of 3-chloro-4-methyl-phenylthioglycollic acid are mixed with 100 parts by volume of chlorobenzene, 2.7 parts by volume of dimethylformamide, and 26 parts by volume of thionyl chloride. The mixture is heated at 55–60° C. for 20 minutes, and the greater part of the gases formed are expelled from the resulting solution by blowing in dry air at the same temperature. The solution of the thioglycollic acid chloride is then added dropwise in the course of 1 hour to a suspension having a temperature of 53–55° C. of 58 parts of anhydrous aluminum chloride in 150 parts by volume of chlorobenzene. The mixture is maintained at 49–51° C. for 2½ hours, then poured on to ice water and some hydrochloric acid. The chlorobenzene is driven off by steam distillation under reduced pressure and the residue isolated by filtration. On washing with cold water and drying under reduced pressure at 40–60° C. there is obtained the 5-methyl-6-chloro-hydroxythionaphthene in a very pure state and in practically quantitative yield.

By using as starting material instead of the 3-chloro-4-methyl-phenylthioglycollic acid the 4-chloro-6-methyl-phenylthioglycollic acid or the 4-chloro-phenylthioglycollic acid or the 3,4-dichloro-phenylthioglycollic acid and proceeding otherwise as described in this Example, there is obtained an equally good yield of 5-chloro-7-methyl- or 5-chloro- or 5,6-dichloro-hydroxythionaphthene, respectively.

Example 5

60.8 parts of 3-chloro-phenylthioglycollic acid are mixed with 100 parts by volume of chlorobenzene, 2.3 parts by volume of dimethyl formamide and 22.3 parts by volume of thionyl chloride. The mixture is heated to 55–60° C. for 15 minutes, and the greater part of the gases formed are expelled from the resulting solution by blowing in dry air at the same temperature. The solution of the thioglycollic acid chloride is then added dropwise in the course of 30 minutes to a suspension of 44 parts of anhydrous aluminum chloride in 100 parts by volume of chlorobenzene having a temperature of 57–60° C. The mixture is maintained at 57–59° C. for 30 minutes and then poured on to ice water and some hydrochloric acid. The chlorobenzene is driven off by steam distillation under reduced pressure and the residue isolated by filtration. On washing with cold water and drying under reduced pressure at 40–50° C. there is obtained 6-chloro-hydroxythionaphthene is a very pure state and in practically quantitative yield.

Example 6

72 parts of 8-chloro-naphthalene-1-thioglycollic acid are mixed with 200 parts by volume of chlorobenzene, 1.1 parts by volume of dimethyl formamide and 21.2 parts by volume of thionyl chloride. The mixture is heated at 55–60° C. for 40 minutes, and a clear solution of the thioglycollic acid chloride is obtained. This solution is added dropwise in the course of 30 minutes to a suspension having a temperature of 45–48° C. of 40 parts of anhydrous aluminum chloride in 200 parts by volume of chlorobenzene. The mixture is maintained at 45–48° C. for 25 minutes and then cooled to 10–15° C. There is then added a solution of bromisatin chloride having a temperature of 85° C., prepared from 66 parts of 5-bromisatin by heating to 90–100° C. for 5 hours with 64 parts of phosphorus pentachloride in 750 parts by volume of chlorobenzene. The reaction mass is then maintained at 54–56° C. for 1 hour. The mixture is then poured on to a mixture of 1200 parts by volume of ice water and 48 parts by volume of 30% hydrochloric acid, and freed from the chlorobenzene by steam distillation. The residue is filtered while warm and washed neutral to Congo with water. For further purification of the dyestuff, the residue is heated to 95° C. for an hour and a half with 1200 parts by volume of water and 90 parts by volume of 10 N-caustic soda solution, then filtered at 80° C. and washed neutral to Brilliant Yellow with warm water, On drying under reduced pressure at 60–70° C. there are obtained 116 parts a dark indigo dyestuff which dyes cotton from a vat fast gray-blue tints.

What is claimed is:

1. Process for the manufacture of hydroxythionaphthenes which consists essentially of reacting one mol of an acid selected from the group consisting of naphthalene-thioglycollic acid, chloronaphthalene-thioglycollic acid, phenyl-thioglycollic acid, chlorophenyl-thioglycollic acid, bromophenyl-thioglycollic acid, methylphenyl-thioglycollic acid and chloromethylphenyl-thioglycollic acid with at least one mol of thionyl chloride in the presence of an inert organic solvent and of a formic acid amide, as catalyst, selected from the group consisting of the amides of the formulae

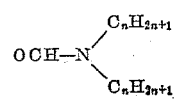

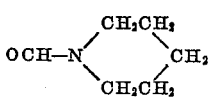

and

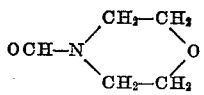

in which *n* is a whole number of at most 4, heating the resulting mixture in the presence of at least one mol of anyhdrous aluminum chloride and isolating the resulting hydroxythionaphthene from the reaction mixture.

2. Process for the manufacture of hydroxythionaphthenes which consists essentially of reacting one mol of an acid selected from the group consisting of naphthalene-thioglycollic acid, chloronaphthalene-thioglycollic acid, phenyl-thioglycollic acid, chlorophenyl-thioglycollic acid, bromophenyl-thioglycollic acid, methylphenyl-thioglycollic acid and chloromethylphenylthioglycollic acid with at least one mol of thionyl chloride in the presence of an organic solvent and dimethyl-formamide as catalyst, heating the resulting mixture in the presence of 1–1.5 mols anhydrous aluminum chloride and isolating the resulting hydroxythionaphthene from the reaction mixture.

3. Process for the manufacture of the hydroxythionaphthene of the formula

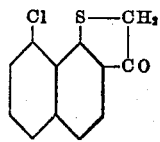

which consists essentially of reacting the 8-chloro-naphthalene-1-thioglycollic acid with at least one mol of thionyl chloride in the presence of chlorobenzene as solvent and dimethyl formamide, as catalyst, heating the resulting mixture in the presence of 1–1.5 mols anhydrous aluminum chloride and isolating the resulting hydroxythionaphthene from the reaction mixture.

References Cited in the file of this patent

UNITED STATES PATENTS

| | | |
|---|---|---|
| 1,765,703 | Runne et al. | June 24, 1930 |
| 2,769,002 | Buisson et al. | Oct. 30, 1956 |

FOREIGN PATENTS

| | | |
|---|---|---|
| 495,448 | Germany | Apr. 16, 1940 |